US009027433B2

(12) United States Patent
Dal Pra'

(10) Patent No.: US 9,027,433 B2

(45) Date of Patent: May 12, 2015

(54) CONTROL DEVICE FOR A BICYCLE AND BICYCLE COMPRISING SUCH A DEVICE

(75) Inventor: Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 1054 days.

(21) Appl. No.: 12/039,810

(22) Filed: Feb. 29, 2008

(65) Prior Publication Data

US 2008/0210042 A1 Sep. 4, 2008

(30) Foreign Application Priority Data

Mar. 1, 2007 (IT) .......................... MI2007A000400

(51) Int. Cl.

*B62L 3/00* (2006.01)

*B62K 23/06* (2006.01)

(52) U.S. Cl.

CPC ........... *B62K 23/06* (2013.01); *Y10T 74/20438* (2015.01); *Y10T 74/206* (2015.01)

(58) Field of Classification Search

CPC ............................... B62K 23/06; B62M 25/04

USPC ................................. 74/502.2, 480 R, 551.8

See application file for complete search history.

(56) References Cited

U.S. PATENT DOCUMENTS 1,706,542 A 3/1929 Pugh et al.
2,384,728 A 9/1945 Crumble
2,586,604 A 2/1952 Bennett
2,770,980 A 11/1956 Millward
2,854,857 A 10/1958 Gleasman et al.
3,279,779 A 10/1966 Thomas et al.
3,760,648 A 9/1973 Hoffman
3,776,061 A 12/1973 Yoshigai
3,915,029 A 10/1975 Shimada
3,972,247 A 8/1976 Armstrong
4,002,350 A 1/1977 Timbs
4,075,871 A 2/1978 Burke
4,100,820 A 7/1978 Evett
4,132,296 A * 1/1979 Evett ............................ 192/217
4,319,673 A 3/1982 Kojima
4,454,784 A 6/1984 Shimano
4,459,871 A * 7/1984 Shimano ..................... 74/480 R
4,605,240 A 8/1986 Ciem et al.
4,740,001 A 4/1988 Torleumke
D298,309 S 11/1988 Coue (Continued)

FOREIGN PATENT DOCUMENTS

CH 248133 4/1947
CN 1144761 3/1997

(Continued)

OTHER PUBLICATIONS

European Search Report, Appl. No. EP 05017003.4, dated Dec. 12, 2005.

(Continued)

*Primary Examiner* — Vinh Luong

(74) *Attorney, Agent, or Firm* — Volpe and Koenig, P.C.

(57) ABSTRACT

A control device for a bicycle, has a first body adapted to be associated with a bicycle handlebar, at least one control member of at least one bicycle component, and a second body, distinct from the first body, associated with the first body to increase a grip surface of the control device and/or to vary the relative position of the at least one control member with respect to the handlebar of the bicycle, so as to adapt the control device to the size of the cyclist's hand.

27 Claims, 17 Drawing Sheets

(56) References Cited

U.S. PATENT DOCUMENTS 4,840,082 A 6/1989 Terashima et al.
4,885,951 A 12/1989 Desenclos et al.
4,930,368 A 6/1990 Nagano
4,945,785 A 8/1990 Romano
4,966,046 A 10/1990 Tagawa
5,012,692 A 5/1991 Nagano
5,020,387 A 6/1991 Nagano
5,050,444 A 9/1991 Nishimura
5,094,120 A 3/1992 Tagawa
RE34,007 E 7/1992 Desenclos et al.
5,159,851 A * 11/1992 Rahmes ........................ 74/551.9
5,186,071 A 2/1993 Iwasaki
5,203,213 A 4/1993 Nagano
5,213,005 A 5/1993 Nagano
5,222,412 A 6/1993 Nagano
5,241,878 A 9/1993 Nagano
5,257,683 A 11/1993 Romano
5,279,179 A 1/1994 Yoshigai
5,287,765 A 2/1994 Scura
5,303,608 A 4/1994 Iwasaki
5,400,675 A * 3/1995 Nagano ........................ 74/502.2
5,479,776 A 1/1996 Romano
5,480,356 A 1/1996 Campagnolo
5,515,743 A 5/1996 Lumpkin
5,528,954 A 6/1996 Yoshigai
5,601,001 A 2/1997 Kawakami et al.
5,676,020 A 10/1997 Jordan et al.
5,676,021 A 10/1997 Campagnolo
5,676,022 A 10/1997 Ose
5,755,139 A 5/1998 Kojima
5,787,757 A 8/1998 Ozaki
5,791,195 A 8/1998 Campagnolo
5,806,372 A 9/1998 Campagnolo
5,832,782 A 11/1998 Kawakami
5,896,779 A 4/1999 Biersteker et al.
5,900,705 A 5/1999 Kimura
5,921,140 A 7/1999 Lemmens et al.
5,970,816 A 10/1999 Savard
6,073,730 A 6/2000 Abe
6,095,010 A 8/2000 Arbeiter
6,098,488 A 8/2000 Vos
6,370,981 B2 4/2002 Watarai
6,457,377 B1 10/2002 Hsu
6,502,477 B1 1/2003 Assel
6,546,827 B2 4/2003 Irie
6,553,861 B2 4/2003 Ose
6,564,670 B2 5/2003 Feng et al.
6,564,671 B2 5/2003 Ose
6,647,823 B2 11/2003 Tsumiyama et al.
6,792,826 B2 9/2004 Dal Pra'
6,957,597 B2 10/2005 Irie et al.
7,100,471 B2 9/2006 Irie et al.
8,161,840 B2 * 4/2012 Nago ........................... 74/502.2
8,459,142 B2 * 6/2013 Orrico et al. ................. 74/502.2
2002/0078789 A1 * 6/2002 Chen ............................ 74/551.8
2002/0104401 A1 8/2002 Dal Pra'
2002/0124679 A1 9/2002 Dal Pra'
2002/0139637 A1 10/2002 Tsumiyama et al.
2003/0094064 A1 5/2003 Dal Pra'
2003/0167871 A1 * 9/2003 Irie et al. ...................... 74/502.2
2003/0177855 A1 9/2003 Tsumiyama et al.
2004/0144193 A1 7/2004 Sato et al.
2004/0237697 A1 12/2004 Kawakami
2004/0237698 A1 * 12/2004 Hilsky et al. ................. 74/502.2
2005/0241428 A1 11/2005 Tsai
2006/0070480 A1 4/2006 Fujii
2006/0207375 A1 9/2006 Jordan et al.
2006/0272443 A1 12/2006 Tsumiyama
2007/0034037 A1 2/2007 Dal Pra' et al.
2007/0068332 A1 3/2007 Fujii et al.
2007/0137388 A1 6/2007 Dal Pra'
2007/0137391 A1 * 6/2007 Fujii ............................ 74/502.2
2007/0178715 A1 8/2007 Fujii
2007/0186715 A1 8/2007 Dal Pra'
2007/0193386 A1 8/2007 Fujii
2007/0193387 A1 * 8/2007 Nakano ........................ 74/501.6
2007/0199401 A1 * 8/2007 Kawakami et al. .......... 74/502.2
2007/0204716 A1 9/2007 Dal Pra'
2008/0098848 A1 5/2008 Dal Pra' et al.
2008/0196537 A1 8/2008 Dal Pra'
2008/0210041 A1 * 9/2008 Dal Pra' et al. .............. 74/502.2
2008/0210042 A1 9/2008 Dal Pra'
2009/0025504 A1 1/2009 Dal Pra' et al.
2009/0031846 A1 2/2009 Dal Pra' et al.
2009/0133526 A1 5/2009 Dal Pra' et al.
2010/0083786 A1 * 4/2010 Miki et al. ...................... 74/489

FOREIGN PATENT DOCUMENTS

CN 2436412 6/2001
CN 1443679 9/2003
CN 1550405 12/2004
DE 3136922 3/1983
DE 3706545 9/1988
DE 19607640 1/1997
DE 202006006796 8/2006
EP 0371254 6/1990
EP 0 478 901 A1 4/1992
EP 0478901 4/1992
EP 0504118 9/1992
EP 0504118 A1 9/1992
EP 0361335 2/1994
EP 0601211 6/1994
EP 0601221 6/1994
EP 0635422 1/1995
EP 0714826 6/1996
EP 0744334 11/1996
EP 0790175 8/1997
EP 1123861 8/2001
EP 1134158 9/2001
EP 1245483 10/2002
EP 0785128 11/2002
EP 1264765 12/2002
EP 1264765 A1 12/2002
EP 1342655 9/2003
EP 1342655 A2 9/2003
EP 1440878 7/2004
EP 1449756 8/2004
EP 1449756 A1 8/2004
EP 1473220 11/2004
EP 1481883 12/2004
EP 1502847 2/2005
EP 1535829 6/2005
EP 1564131 8/2005
EP 1642823 4/2006
EP 1698550 9/2006
EP 1739001 1/2007
EP 1816066 8/2007
EP 1826111 8/2007
EP 1964764 A2 * 9/2008 ............. B62K 23/06
FR 960276 4/1950
FR 2777528 10/1999
FR 2861686 2/2006
GB 615173 1/1949
GB 2012893 8/1979
JP 58003987 6/1956
JP 51060342 5/1976
JP 17893 1/1982
JP 17894 1/1982
JP 58030884 A 2/1983
JP 224879 12/1983
JP 60107475 6/1985
JP 62-176097 11/1987
JP 64-083489 3/1989
JP 157092 10/1989
JP 01-314683 12/1989
JP 2088384 3/1990
JP 2-225191 * 9/1990 .................. 74/502.2
JP 02-225191 9/1990
JP 03-107391 5/1991
JP 03292280 12/1991
JP 04331689 11/1992
JP 05097088 A 4/1993
JP 05082786 11/1993

(56) References Cited

FOREIGN PATENT DOCUMENTS

| | | | |
|---|---|---|---|
| JP | 05286476 | | 11/1993 |
| JP | 06016170 | | 1/1994 |
| JP | 07033063 | A | 2/1995 |
| JP | 07251784 | | 10/1995 |
| JP | 08328679 | A | 12/1996 |
| JP | 2000-172354 | | 6/2000 |
| JP | 2002-293282 | | 10/2002 |
| JP | 2003-261084 | | 9/2003 |
| JP | 61241287 | | 10/2007 |
| TW | 136125 | Y | 6/1990 |
| TW | 510875 | | 11/2002 |
| TW | 519089 | | 1/2003 |
| TW | 570013 | Y | 1/2004 |
| TW | 589267 | | 6/2004 |
| TW | 1223636 | | 11/2004 |
| TW | I249494 | | 2/2006 |
| WO | 92/18374 | | 10/1992 |
| WO | 9218374 | | 10/1992 |
| WO | 03093094 | | 11/2003 |
| WO | 2005044656 | | 5/2005 |

OTHER PUBLICATIONS

English translation of Nov. 30, 2010 Office Action issued in corresponding Chinese Appln. No. 200810082341.2.

Chinese Office Action, Appl. No. CN 200610090826.7, dated Apr. 3, 2009.

Chinese Office Action, Appl. No. CN 200710005823.3, dated Sep. 25, 2009.

Chinese Office Action, Appl. No. CN 200810082341.2, dated Nov. 30, 2010.

European Search Report, Appl. No. EP 05425458.6, dated Nov. 16, 2005.

European Search Report, Appl. No. EP 05017003.4, dated Dec. 20, 2005.

European Search Report, Appl. No. 06003694.4, dated Jul. 31, 2006.

European Search Report, Appl. No. RS 144832, dated Apr. 16, 2007.

European Search Report, Appl. No. RS 115409, dated Jul. 18, 2007.

European Search Report, Appl. No. RS 115410, dated Jul. 31, 2007.

European Search Report, Appl. No. RS115682, dated Oct. 30, 2007.

European Search Report, Appl. No. 08003760.9, dated Jun. 27, 2008.

European Search Report, Appl. No. EP 08003755.9, dated Jun. 27, 2008.

European Search Report, Appl. No. EP 08022485.0, dated Jul. 2, 2009.

European Search Report, Appl. No. 08005438.0, dated Nov. 5, 2010.

Japanese Office Action, Appl. No. JP 2002-332045, dated Dec. 16, 2008.

Japanese Office Action, Appl. No. JP 2008-550914, dated May 24, 2011.

Japanese Office Action, Appl. No. 2006-176333, dated Aug. 23, 2011.

Taiwan Search Report, Appl. No. 096101651, dated Oct. 5, 2011.

Taiwan Office Action and Search Report, Appl. No. 095121477, dated Nov. 25, 2011.

Japanese Office Action for Appln. 2008-048978, issued Jun. 12, 2012 with English translation.

English translation of Taiwanese Office Action for Application No. 097107173, issued on Oct. 29, 2012.

* cited by examiner

CONTROL DEVICE FOR A BICYCLE AND BICYCLE COMPRISING SUCH A DEVICE

FIELD OF INVENTION

The present invention relates to a control device for a bicycle. In particular, the invention relates to a control device used to ride a bicycle and to actuate/control at least one bicycle component as in, for example, a derailleur (front or rear), a brake (for the front or rear wheel), a servo-assisted gearshift, or a cyclecomputer.

BACKGROUND

Known control devices for racing bicycles are associated with the curved portions of the bicycle handlebar, one on the right and one on the left, to allow the cyclist to grip it to ride the bicycle, as an alternative to the grip on the classical grip provided on the curved portions of the handlebar, and to allow simultaneous actuation/control of one or more components of the bicycle as in, for example, a brake (front or rear), a derailleur (front or rear), and possibly a cyclecomputer.

Known control devices typically comprise a support body mounted on the handlebar of the bicycle so as to project ahead from it and it is shaped so as to make it easier for the cyclist to grip it in particular racing situations. Moreover, in the case in which there is a derailleur actuation lever on the inner side wall of the support body, when the cyclist actuates this lever with his thumb it can knock against the ends of the other fingers. In these circumstances an uncomfortable condition for the cyclist occurs, with a consequent loss of efficiency of the grip.

Moreover, in the case of cyclists with large hands, the space defined on the support body between the derailleur actuation lever arranged behind the brake lever and the handlebar can be very small, with the consequent possibility of accidental contact with the aforementioned lever when the cyclist rides the bicycle gripping the handlebar at the opposite curved end portions thereof. Such an accidental contact is made even more probable by the fact that the cyclist typically wears gloves that increase the bulk of the fingers.

SUMMARY

The control device for a bicycle includes a first body adapted to be associated with a bicycle handlebar. The control device further includes at least one control member of at least one bicycle component, and a second body, distinct from the first body, associated with the first body.

A kit of parts can also be assembled to form a control device for a bicycle. The kit includes a first body adapted to be associated with a bicycle handlebar and is provided with at least one control member of at least one bicycle component. The kit further includes at least two second bodies adapted to be selectively associated with the first body, wherein the at least two second bodies differ in at least one of shape and size.

BRIEF DESCRIPTION OF THE DRAWING(S)

Further characteristics and advantages of the control device shall become clearer from the following detailed description of some preferred embodiments thereof, made with reference to the attached drawings. In these drawings.

Figure 2:
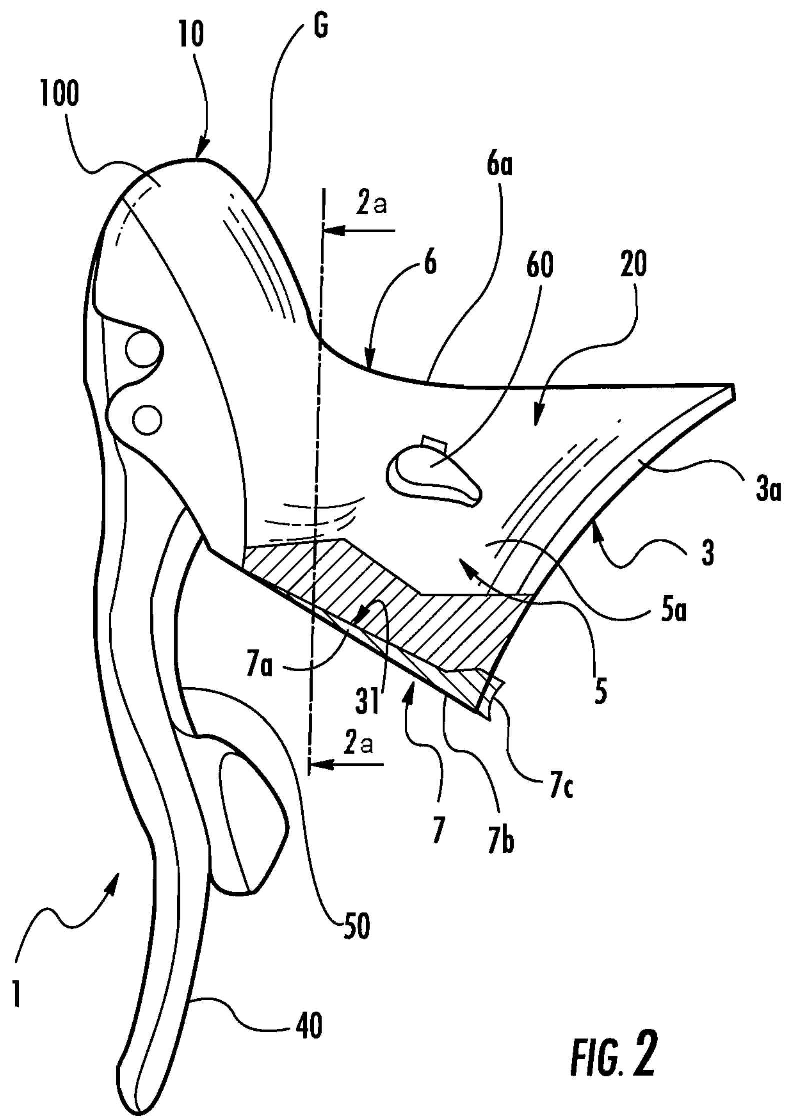
FIG. 2 is a side view partially in section of a first embodiment of a control device.
Figures 2A, 3, 4:
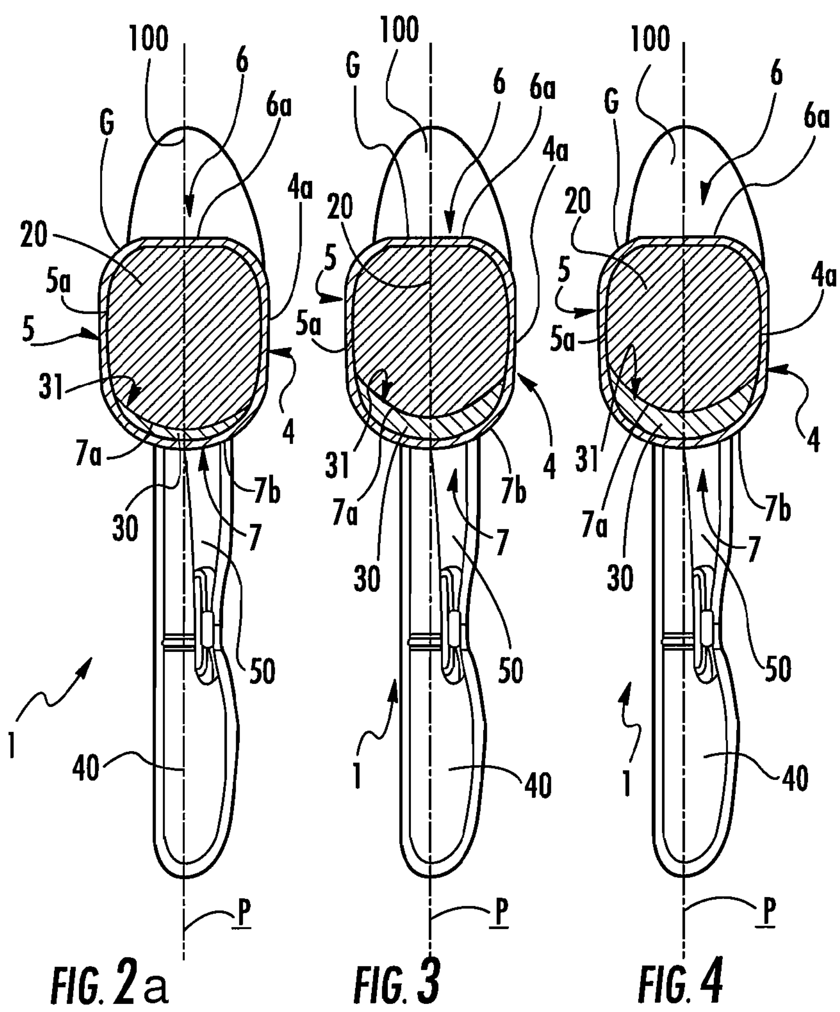
Figure 5:
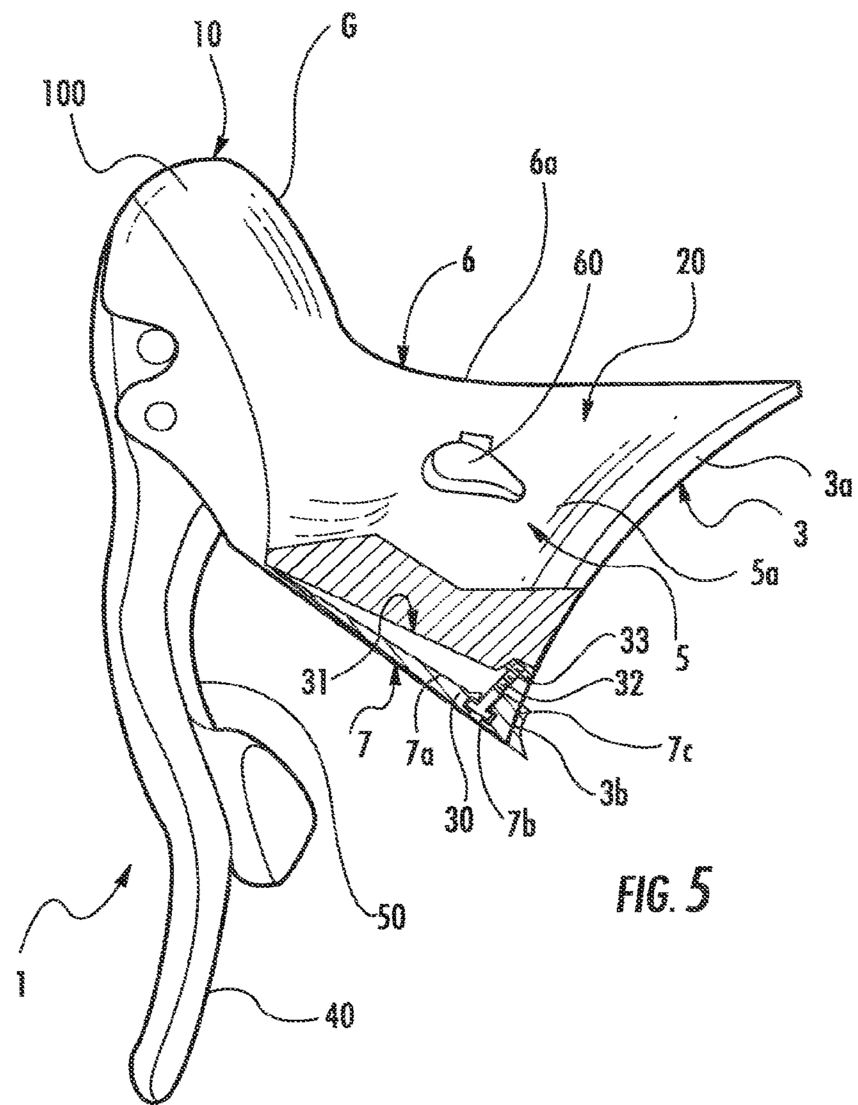
Figure 6:
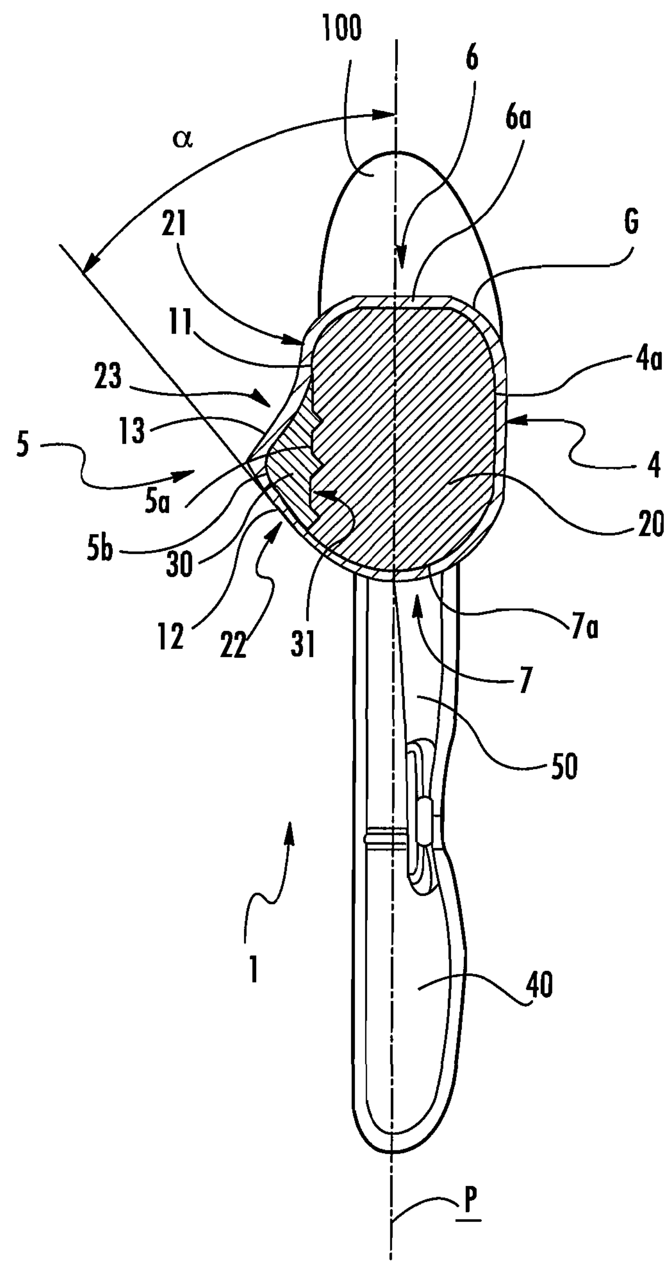
Figure 7:
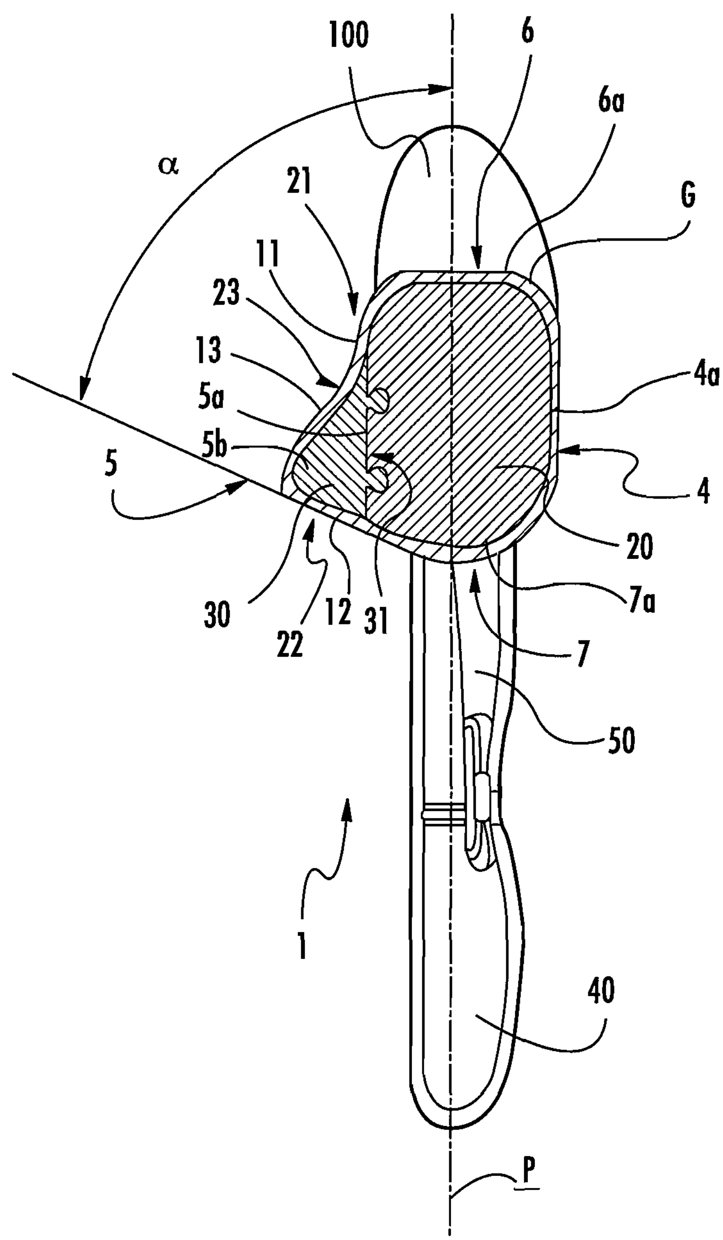
Figure 8:
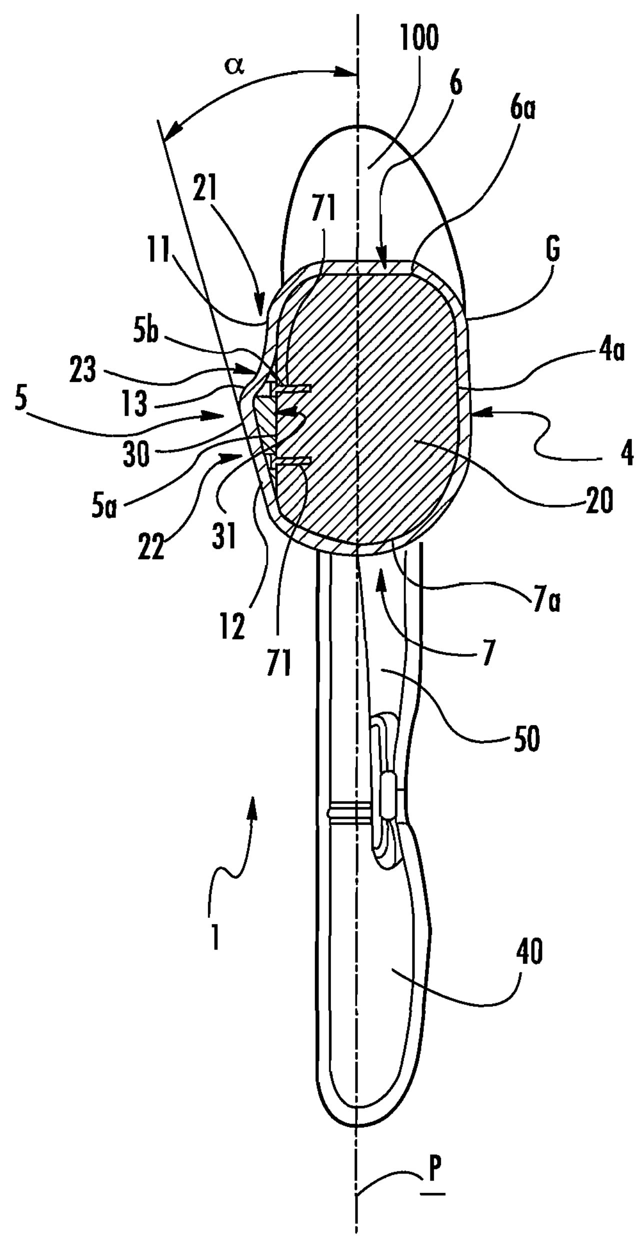
Figure 9:
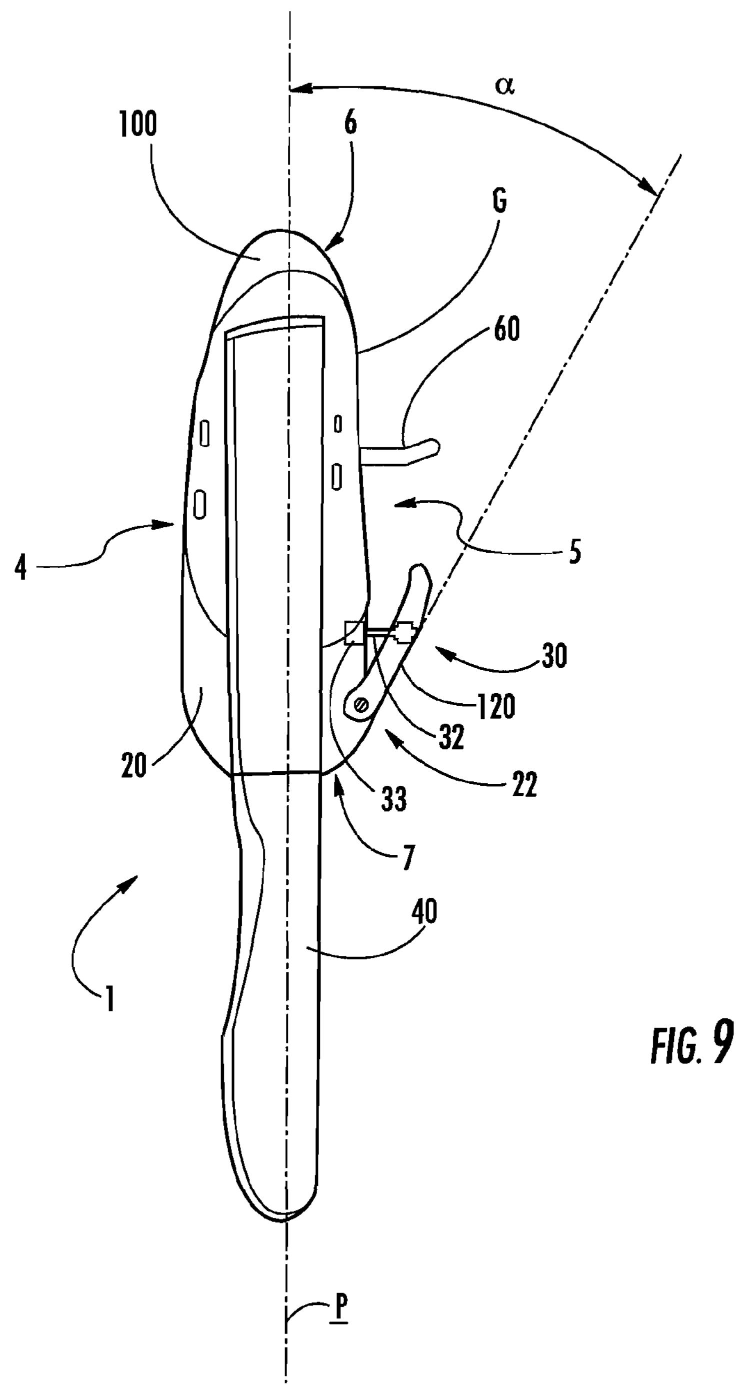
Figure 16:
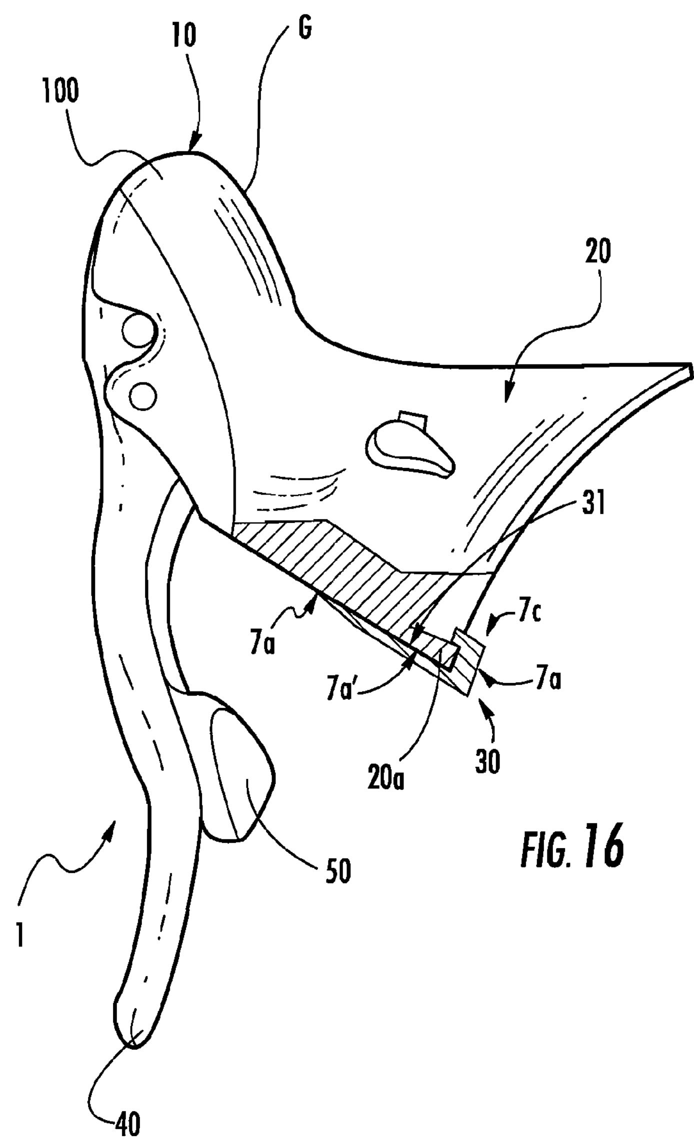
Figures 16A, 16B, 16C:
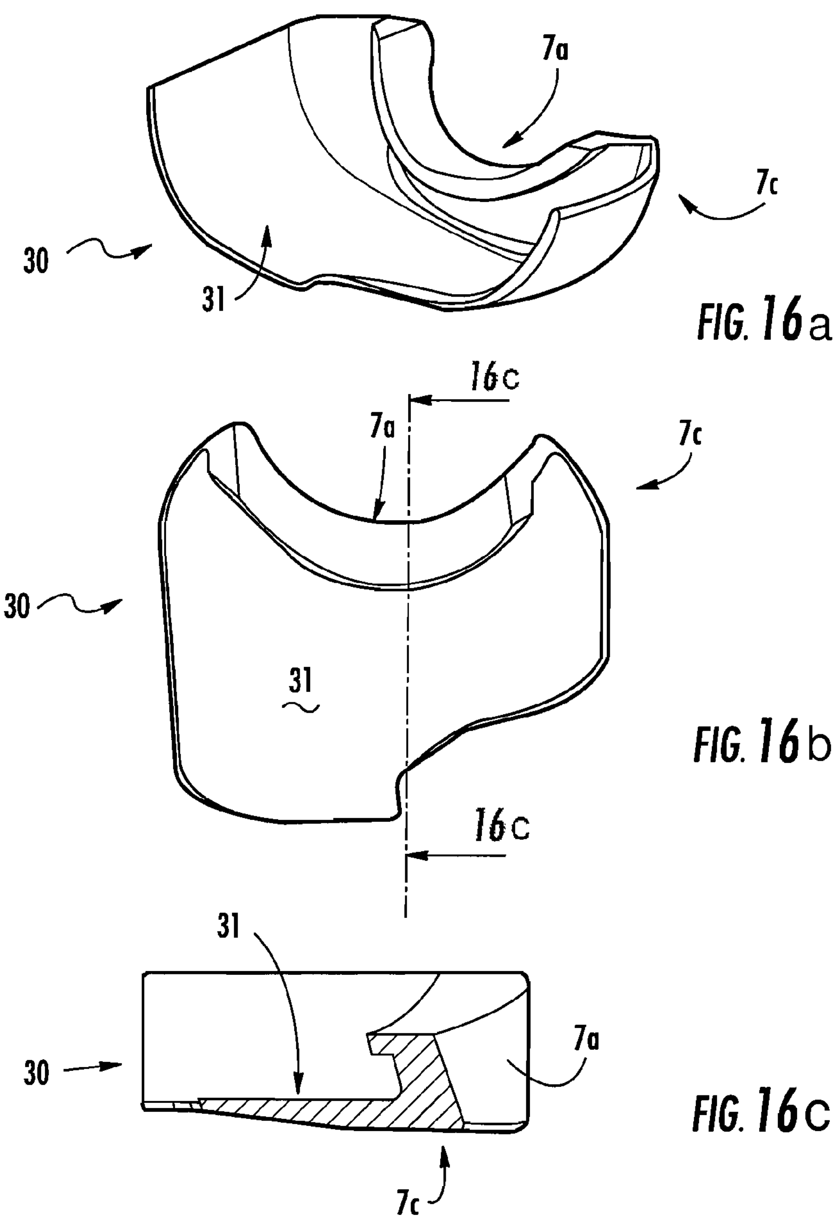

FIG. 2*a* is a sectional view along the plane 2a-2a of FIG. 2;

FIGS. 3 and 4 are sectional views of two alternative embodiments of the control device;

FIG. 5 is a side view partially in section of a further embodiment of the control device;

FIGS. 6 to 8 are sectional views of three further alternative embodiments of the control device;

FIG. 9 is a schematic front view of a further embodiment of the control device;

FIGS. 10-15 are side views partially in section of further alternative embodiments of the control device;

FIG. 16 is a side view partially in section of a further embodiment of a control device;

FIG. 16*a* is a perspective view of an element (second body) of the control device of FIG. 16;

FIG. 16*b* is a top view of the element of FIG. 16*a;*

FIG. 16*c* is a sectional view along the plane 16c-16c of FIG. 16*b;*

Figure 17:
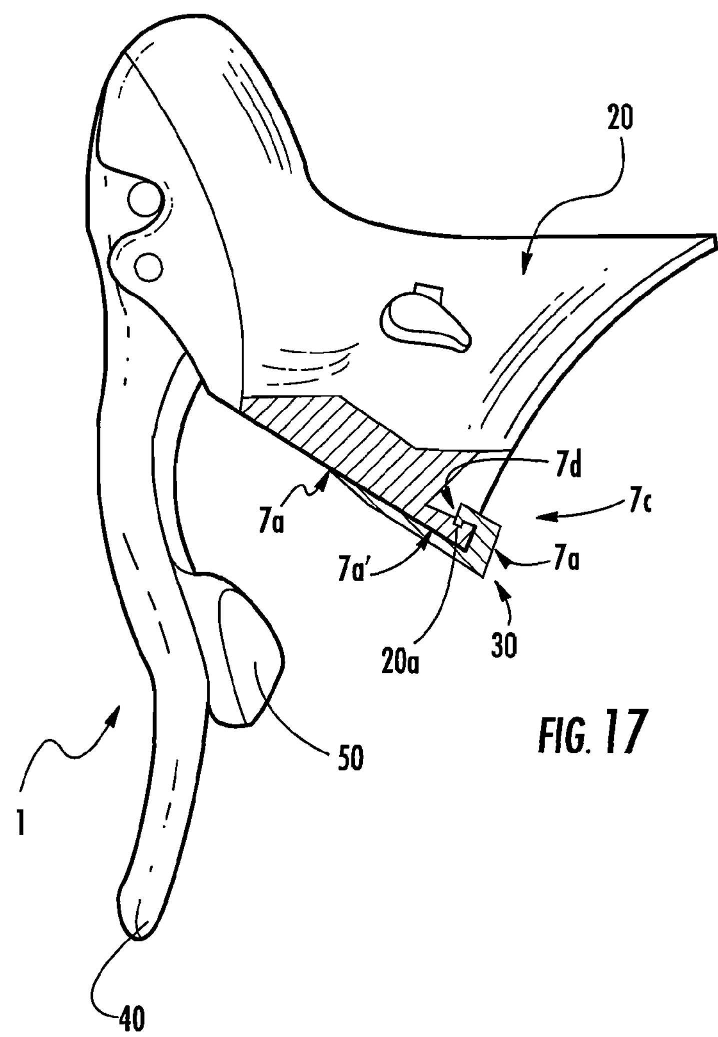

FIG. 17 is a side view partially in section of a further embodiment of a control device.

DETAILED DESCRIPTION OF THE PREFERRED EMBODIMENT(S)

Introduction to the Embodiments

The control device is adapted to be used in a racing bicycle, i.e., in a bicycle whose handlebar has opposite curved free end portions.

A bicycle can comprise the aforementioned control device.

Further, a kit of parts can be assembled to form the aforementioned control device.

Throughout the present description and in the subsequent claims, the spatial terms, in particular the terms front, rear, side, upper, lower, vertical, and horizontal, are used with reference to the mounted condition of the control device on the handlebar of the bicycle. The terms inner and outer, on the other hand, with reference to the handlebar in a neutral position, identify the area towards the center of the handlebar and the area opposite the center of the handlebar with respect to an intermediate reference plane which substantially vertically passes through the control device.

In a first aspect thereof, a control device for a bicycle comprises a first body adapted to be associated with a bicycle handlebar, at least one control member of at least one bicycle component, and a second body, distinct from the first body, associated with the first body.

The control device that is formed from two distinct bodies can be associated with each other allows the cyclist to adapt the control device to the size of his hand. The cyclist has the possibility of increasing the hand rest surface and/or of modifying the relative positioning of the control members with respect to the handlebar.

A suitable coupling and positioning of the second body at suitable surfaces of the first body allows the hand rest surface to be increased. In this case, the aforementioned first body defines a first grip portion of the control device and the second body defines a second grip portion of the control device.

A suitable coupling and positioning of the second body at suitable surfaces of the first body also allows the space between the possible derailleur actuation lever arranged behind a brake lever to be increased.

In this case, the second body is associated with the first body so as to be operatively interposed between the first body and the handlebar of the bicycle when the first body is associated with such handlebar.

A suitable coupling and positioning of the second body at suitable surfaces of the first body also allows the distance between the brake lever and the handlebar to be reduced.

Also in this case, the second body is associated with the first body so as to be operatively interposed between the first body and the handlebar of the bicycle when the first body is associated with such handlebar.

The second body is associated with the first body at respective coupling surfaces having a matching shape. In particular, a shape coupling is made between the second body and the first body.

In a first embodiment of the control device, the second body is positioned in a single predetermined position with respect to the first body. In this case a plurality (for example three) of second bodies of different shapes and sizes can be provided so as to allow the cyclist to select the most suitable one, according to the size of his own hand.

In this case, the coupling between the first body and the second body can, for example, be carried out through screws, glue, or through a snap coupling or a dap joint. A simple shape coupling can also be carried out in which the coupling of the two matching surfaces is maintained by the holding action exerted by an outer coating sheath that covers the first body and the second body.

In an alternative embodiment thereof, the control device comprises at least one adjustment member of the position of the second body with respect to the first body. The cyclist in this case has the opportunity to precisely adjust the relative positioning of the second body with respect to the first body.

This adjustment member comprises a screw/female screw coupling operatively interposed between the first body and the second body, wherein one from the screw and the female screw is associated with one from the first body and the second body and the other from the screw and the female screw is associated with the other from the first body and the second body.

The second body is removably associated with the first body, so as to be able to allow an interchangeability of the second bodies.

Irrespective of the specific embodiment of the control device, an outer coating sheath covers the first body and the second body. Such a sheath also carries out the function of keeping the coupling surfaces of the first body and of the second body in contact with each other, ensuring the coupling between first body and second body even in the absence of further connection means such as glue or screws.

The control device comprises various embodiments, including wherein the second body is associated with a lower surface, an inner side surface, an outer side surface, an upper surface and a rear surface, respectively, of the first body and extends fully or only partially over one or more of the aforementioned surfaces of the first body. When the second body is associated with the rear surface of the first body, the second body is operatively interposed between the first body and the handlebar when the first body is associated with the handlebar.

In a second aspect thereof, a bicycle comprising the control device described above has all of the structural and functional characteristics discussed above with reference to the control device individually or in combination.

In a third aspect thereof, a kit of parts for the assembly of a control device for a bicycle, comprises a first body adapted to be associated with a bicycle handlebar and provided with at least one control member of at least one bicycle component, and at least two second bodies adapted to be selectively associated with the first body, wherein the at least two second bodies differ in at least one from shape and size.

The aforementioned kit of parts allows the cyclist to adapt the control device to the size of his own hand, increasing the hand rest surface and/or modifying the relative positioning of the control members with respect to the handlebar.

DETAILED DESCRIPTION

The following description is made with reference to a right control device, i.e., a control device that is adapted to be associated with the handlebar of the bicycle at the curved end portion of the handlebar that, looking at the handlebar in the neutral position thereof and from a point of view like that of the cyclist during travel, is located to the right of the cyclist. However, it is clear that what is described has analogous application in the case of a left control device.

Figure 1:
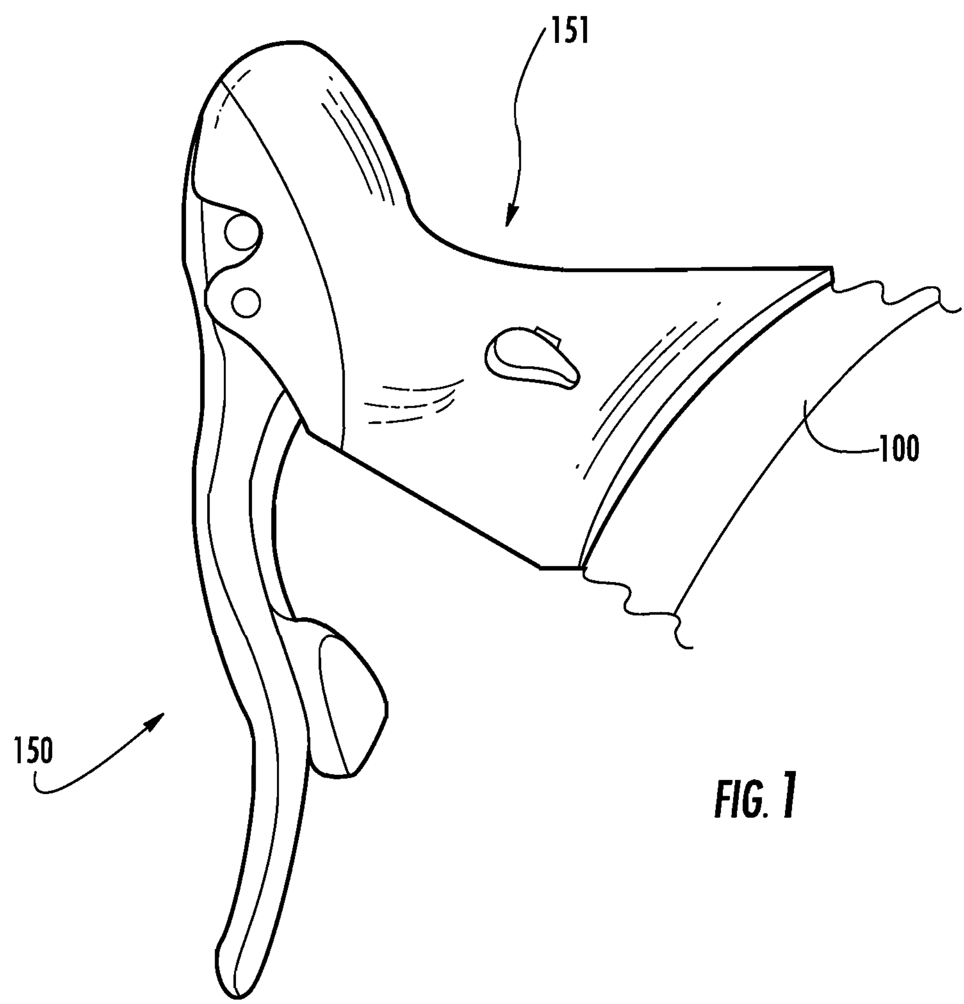
FIG. 1 is a side view of a known control device.

FIG. 1 shows a known control device 150. Such a device comprises a main body 151 made in a single piece. The main body 151 is adapted to be mounted on the handlebar of a racing bicycle at the opposite curved end portions of the handlebar.

FIGS. 2-15, on the other hand, show various embodiments of a control device 1.

In all of these embodiments, the control device 1 comprises a first body 20 and a second body 30 associated with the first body 20.

The control device 1 is adapted to be fixed, at a rear wall 3 thereof, to a curved end portion of a handlebar 100 of a racing bicycle, so as to project ahead of the handlebar to be gripped by the cyclist in particular racing situations as in, for example, climbing or sprinting.

The attachment of the control device 1 to the handlebar of the bicycle takes place through conventional connection means (not illustrated) as, for example, a clip.

The control device 1 is defined, as well as by the rear wall 3, by an outer side wall 4 (FIGS. 2*a*, 3, 4, 6-8), an inner side wall 5 arranged on the opposite side to the outer side wall 4 with respect to an intermediate reference plane P (FIGS. 2*a*, 3, 4, 6-8) vertically passing through the first body 20, an upper transversal wall 6 connecting the outer side wall 4 and the inner side wall 5 together and a lower transversal wall 7 opposite the upper transversal wall 6.

Throughout the present description and in the subsequent claims, the expression “intermediate reference plane” is used to indicate any substantially vertical plane that passes through the control device, not necessarily a plane of symmetry or a middle plane of such a control device.

All the walls of the control device 1 are covered by an outer coating sheath G.

In all the embodiments illustrated in the attached figures, the first body 20 is shaped so as to make it easier for the cyclist to grip it. Therefore, it has a projection 100 upwards in a front portion 10 thereof. Thus the upper wall 6*a* of the body 20 has a substantially saddle-shaped profile, as illustrated in FIGS. 2, 2*a*, 5, 10-15.

In the embodiment illustrated in FIGS. 2 and 2*a*, the outer side wall 4, the inner side wall 5, the upper transversal wall 6 and the rear wall 3 of the control device 1 are defined by an outer side surface 4*a*, an inner side surface 5*a*, an upper transversal surface 6*a* and a rear surface 3*a* of the first body 20, respectively, whereas the lower transversal wall 7 of the control device 1 is fully defined by a lower transversal surface 7*b* of the second body 30.

An alternative embodiment of the control device 1 illustrated in FIGS. 2 and 2*a* can be provided, wherein the lower transversal wall 7 of the control device 1 is defined in part by the lower transversal surface 7*b* of the second body 30 and in part by a lower transversal surface 7*a* of the first body 20. In this case, the second body 30 is shorter in length than the first body 20 at the respective lower transversal surfaces 7*a* and 7*b*. The control device 1 comprises, at the front portion 10 of the first body 20, a brake cable actuation lever 40. The lever 40 is hinged to the first body 20 at the upper part of the first body 20 in a conventional way.

The control device 1 further comprises an actuation lever 50 of a derailleur (in particular of a rear derailleur) in a first gearshifting direction. The lever 50 is arranged behind the brake lever 40 and is articulated to the first body 20 in a conventional way.

The control device 1 then comprises a derailleur actuation lever 60 in a gearshifting direction opposite the one in which the derailleur is actuated by acting upon the lever 50. The lever 60 is articulated to the first body 20 at the inner side surface 5*a* thereof and projects from it. The lever 50 and the lever 60 act upon a mechanical-type control device arranged inside the first body 20 as, for example, described in U.S. Pat. No. 6,792,826 to the same Applicant, incorporated herein by reference.

The second body 30 has a coupling surface 31 with the first body 20.

The second body 30 can be associated with the first body 20 at any of the various surfaces of the first body 20.

With particular reference to the embodiment illustrated in FIGS. 2 and 2*a*, the second body 30 is associated with the first body 20 at the lower surface 7*a* of the first body 20 and extends substantially over the entire lower surface 7*a* of the first body 20. The second body 30 can be positioned with respect to the first body 20 so as to define a single predetermined relative position. Between the lower surface 7*a* of the first body 20 and the coupling surface 31 of the second body 30, an adhesive substance can be arranged, for example a glue, but other coupling means can be provided such as, for example, screws. It is also possible to simply provide a shape coupling between matching surfaces 7*a* and 31 of the first body 20 and of the second body 30, such a coupling being kept operative by the compression action exerted by the outer coating sheath G. The coupling between the surface 7*a* of the first body 20 and the matching surface 31 of the second body 30 can also be a snap or dap joint coupling.

In the embodiment illustrated in FIGS. 2 and 2*a*, the outer side wall 4 and the inner side part 5 of the control device 1 have respective surfaces substantially parallel to the intermediate reference plane P, apart from small convexities and roundings.

When the cyclist grips the control device 1, part of the palm of his hand rests on the upper transversal wall 6 and part on the outer side wall 4. The fingers of the hand, meanwhile, rest upon part of the outer side wall 4, upon the lower transversal wall 7 and upon the inner side wall 5. The thumb embraces the control device 1 from the top resting upon the surface of the inner side wall 5, whereas the other fingers embrace the control device from the bottom with their ends resting upon the surface of the inner side wall 5. Comparing FIGS. 2 and 2*a* with FIG. 1, it can be seen how the use of the second body 30 causes on the control device 1 an increase of the rest surface for the cyclist's hand.

The second body 30 can also comprise a portion 7*c* (shown with a broken line in FIG. 2) that, projecting rearwardly with respect to the first body 20, allows the levers 40 and 50 to be moved away from the handlebar.

FIG. 16 shows an alternative embodiment of a control device. In the embodiment shown in FIG. 16, the second body 30 is associated with the first body 20 at the lower surface 7*a* of the first body 20 and extends for a short part of such a lower surface 7*a*. The second body 30 comprises a portion 7*c* that, projecting rearwardly with respect to the first body 20, allows the control device 1 to be positioned on the handlebar in a rotated position with respect to that of a conventional control device, with the levers 40 and 50 being more distant from the handlebar. This is a favourable configuration in the case of cyclists with large hands.

More specifically, as also shown in FIGS. 16*a* to 16*c*, the second body 30 has a coupling surface 31 having a shape which substantially match that of the part 7*a*' of the lower surface 7*a* against which it is in contact, while the projecting portion 7*c* is substantially U-shaped and is coupled with an edge 20*a* of the first body 20. Such a coupling occurs substantially by mechanical interference. The rear part 7*e* of the projecting portion 7*c*, that is the part which faces the handlebar, has a substantially cylindrical shape adapted to couple with the substantially cylindrical outer surface of the handlebar.

The alternative embodiment of FIG. 17 differs from that of FIG. 16 in that the U-shaped end part has an undercut edge 7*d*. The area of the projecting portion 7*c* where is formed such an undercut edge 7*d* is preferably elastically pliable so that the second body 30 can be snap coupled to the first body 20.

FIGS. 3 and 4 show alternative embodiments of the control device 1. In FIGS. 3 and 4, elements corresponding to those described above with reference to the embodiment illustrated in FIGS. 2 and 2*a* are indicated with the same reference numeral.

The embodiments illustrated in FIGS. 3 and 4 differ from the one illustrated in FIGS. 2 and 2*a* only for the size of the second body 30. In particular, the height of the second body 30 of FIG. 3 is greater than that of the second body 30 of FIGS. 2 and 2*a* and the height of the second body 30 of FIG. 4 is greater than that of the second body 30 of FIG. 3. Comparing FIGS. 2*a*, 3, and 4 it can be seen how, as the height of the second body 30 increases, the rest surface for the cyclist's hand increases.

The coupling between the first body 20 and the second body 30 can be of the removable type.

A removable coupling can, for example, be made by providing a coupling through screws, or through shape coupling at the matching surfaces of the first body 20 and of the second body 30.

FIG. 5 illustrates an embodiment of the control device 1 which differs from that of FIGS. 2 and 2*a* only in that the coupling between the first body 20 and the second body 30 is of the adjustable type. The elements of FIG. 5 corresponding to those described above with reference to the embodiment illustrated in FIGS. 2 and 2*a* are indicated with the same reference numeral.

In the embodiment of FIG. 5, an adjustment member of the relative position between the second body 30 and the first body 20 is provided so as to be able to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

The second body 30 can also comprise a portion 7*c* (shown with a broken line in FIG. 5) which projects rearwardly with respect to the first body 20. In this case, by acting upon the screw 32 the grip surface of the control device 1 and the distance of the levers 40 and 50 from the handlebar are simultaneously adjusted.

Further alternative embodiments of the control device 1 are provided as in, for example, those illustrated in FIGS. 6, 7, and 8. In such figures, elements corresponding to those described above with reference to the embodiment illustrated in FIGS. 2 and 2*a* are indicated with the same reference numeral.

The embodiments of FIGS. 6-8 differ from the one illustrated in FIGS. 2 and 2*a* in that the second body 30 is associated with the first body 20 at an inner side surface 5*a* of the first body 20 and in that the inner side wall 5 of the control device 1 has surface portions not parallel to the intermediate reference plane P.

The inner side part 5 of the control device 1 is in this case defined in part by an inner side surface 5*b* of the second body 30 and in part by an inner side surface 5*a* of the first body 20, whereas the outer side wall 4, the upper transversal wall 6, the lower transversal wall 7, and the rear wall 3 of the control device 1 are, on the other hand, defined by an outer side surface 4*a*, an upper transversal surface 6*a*, a lower transversal surface 7*a*, and a rear surface 3*a*, respectively, of the first body 20.

Alternative embodiments of the control device 1 illustrated in FIGS. 6-8 can be provided, wherein the inner side wall 5 of the control device 1 is defined integrally by the inner side surface 5*b* of the second body 30. In this case, the second body 30 has a height substantially equal to that of the first body 20 at the respective inner side surfaces 5*a* and 5*b*.

The inner side wall 5 of the control device 1 has an upper portion 21, a lower portion 22, and an intermediate portion 23. The lower portion 22 and the intermediate portion 23 are defined in the second body 30, whereas the upper portion 21 is defined in the first body 20.

The upper portion 21 has a surface 11 substantially parallel to the intermediate reference plane P, and therefore to the surface of the outer side portion 4, again apart from small convexities and roundings. The lower portion 22, on the other hand, has a surface 12 which is inclined by an angle α with respect to the plane P. Between the surface 11 of the upper portion 21 and the surface 12 of the lower portion 22, an intermediate surface 13 is defined. Such an intermediate surface 13 is therefore defined at the intermediate portion 23 of the inner side wall 5 of the control device 1.

The orientation of the surface 12 of the lower portion 22 of the inner side wall 5 is such that the surface 12 moves away from the intermediate reference plane P (and therefore from the outer side wall 4) as one moves along the inner side wall 5 from the lower portion 22 towards the upper portion 21, i.e., from the bottom towards the top.

The angle α of inclination can be selected within the range of values between 20° and 60°.

However, in the preferred embodiment of the control device 1, the angle α is within the range of values between 30° and 60°, and preferably is substantially equal to 40°.

The orientation of the intermediate surface 13, on the other hand, is such that the surface 13 goes towards the intermediate reference plane P (and therefore to the outer side wall 4) as one moves along the inner side wall 5 from the lower portion 22 towards the upper portion 21.

The surface 12 of the lower portion 22 of the inner side wall 5 and the intermediate surface 13 define an enlargement of the control device 1 which has, in a direction from the bottom towards the top, an extension greater than the extension of the surface 11 of the upper portion 21 of the side wall 5.

In an alternative embodiment (not illustrated) of the control device, the coupling between the first body 20 and the second body 30 can be made at the outer side wall 4*a* of the first body 20.

FIG. 6 illustrates in particular an embodiment of the control device 1 wherein the coupling between the second body 30, in which the lower portion 22 and the intermediate portion 23 of the inner side wall 5 are defined, and the first body 20 takes place at respective coupling surfaces having a matching shape. The two coupling surfaces are kept in abutment against one another by the outer coating sheath G. In the illustrated example, the angle of inclination α is substantially equal to 40°, but the value of such an angle can be anything within the range between 20° and 60°.

FIG. 7, on the other hand, illustrates an embodiment of the control device 1, wherein the coupling between the second body 30, in which the lower portion 22 and the intermediate portion 23 of the inner side wall 5 of the control device 1 are defined, and the first body 20 is a snap coupling. In the illustrated example, the angle of inclination α is substantially equal to 60°, but the value of such an angle can be anything within the range between 20° and 60°.

FIG. 8 illustrates a further embodiment of the control device 1, wherein the coupling between the second body 30, in which the lower portion 22 and the intermediate portion 23 of the inner side wall 5 of the control device 1 are defined, and the first body 20 takes place through screws 71. In the illustrated example, the angle of inclination α is substantially equal to 20°, but the value of such an angle can be anything within the range between 20° and 60°.

In a further embodiment of the control device 1, or possibly also in the embodiments illustrated in FIGS. 6, 7, and 8, between the coupling surfaces 31 of the second body 30 and 5*a* of the first body 20, an adhesive substance can be arranged as, for example, a glue.

In the embodiments illustrated in FIGS. 6-8, when the cyclist grips the control device 1, part of the palm of his hand rests upon the upper transversal wall 6 and part upon the outer side wall 4. The fingers of the hand, meanwhile, rest upon part of the outer side wall 4, upon the lower transversal wall 7, and upon the inner side wall 5. The thumb embraces the control device 1 from the top resting upon the surface 11 of the upper portion 21 or upon the surface 13 of the intermediate portion 23 of the inner side wall 5, whereas the other fingers embrace the control device 1 from the bottom with their ends resting upon the surface 12 of the lower portion 22 of the inner side wall 5.

FIG. 9 shows a further alternative embodiment of the control device 1. In this figure, elements corresponding to those described above with reference to the embodiment illustrated in FIGS. 2 and 2*a* are indicated with the same reference numeral.

The embodiment of FIG. 9 differs from the one illustrated in FIGS. 2 and 2*a* only in that, in this embodiment, the second body 30 is defined by a finger rest element 120 associated with the first body 20 at a lower portion 22 of the latter. The finger rest element 120 extends according to a direction inclined by the angle α with respect to the intermediate reference plane P. Between the finger rest element 120 and the first body 20 an inclination adjustment member of the finger rest element 120 with respect to the first body 20 is provided. In the illustrated example, such an adjustment member comprises an adjustment screw 32 associated, at one end thereof, with a female screw 33 fixedly connected to the first body 20 and, at the opposite end thereof, with the finger rest element 120. Alternatively, the screw 32 can be associated with the finger rest element 120 and the female screw 33 can be fixedly connected to the first body 20.

When the cyclist grips the control device 1, part of the palm of his hand rests upon the upper transversal wall 6 and part upon the outer side wall 4. The fingers of the hand, meanwhile, rest upon part of the outer side wall 4, upon the lower transversal wall 7, and upon the inner side wall 5. The thumb embraces the control device 1 from the top resting upon the surface of the inner side wall 5, whereas the other fingers embrace the control device 1 from the bottom with their ends resting upon the finger rest element 120.

Figure 10:
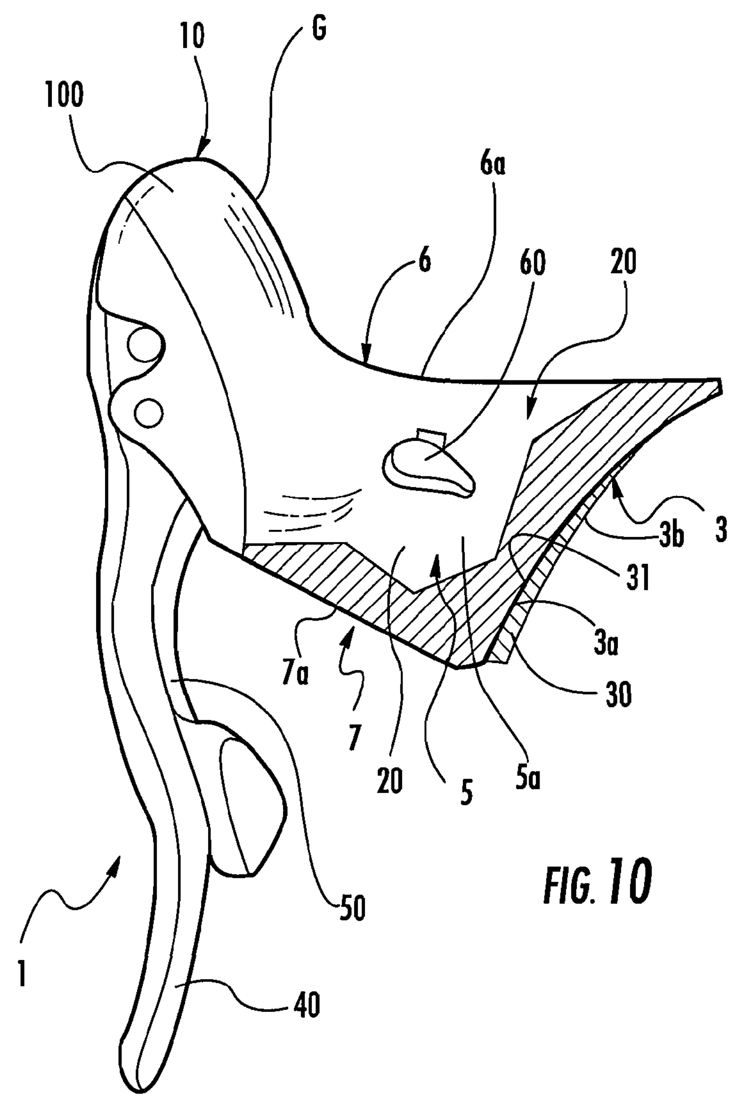

FIG. 10 illustrates a further embodiment of the control device 1. Such an embodiment differs from that of FIGS. 2 and 2*a* only in that the second body 30 is associated with the first body 20 at the rear surface 3*a* of the latter and extends over a part of the rear surface 3*a*, with the thicker part of the second body 30 arranged at the lower part of the rear surface 3*a* of the first body 20. In FIG. 10, elements corresponding to those described above with reference to the embodiment illustrated in FIGS. 2 and 2*a* are indicated with the same reference numeral.

The second body 30 can be positioned with respect to the first body 20 so as to define a single predetermined relative position. Between the rear surface 3*a* of the first body 20 and the coupling surface 31 of the second body 30 an adhesive substance can be provided as in, for example, a glue.

In the embodiment of FIG. 10, the rear wall 3 of the control device 1 is defined in part by the rear surface 3*a* of the first body 20 and in part by the rear surface 3*b* of the second body 30, whereas the outer side wall 4, the inner side wall 5, the upper transversal wall 6, and the lower transversal wall 7 of the control device 1 are, on the other hand, defined by an outer side surface 4*a*, an inner side surface 5*a*, an upper transversal surface 6*a*, and a lower transversal surface 7*a*, respectively, of the first body 20.

An alternative embodiment of the control device 1 illustrated in FIG. 10 can be provided, wherein the rear wall 3 of the control device 1 is integrally defined by the rear surface 3*b* of the second body 30. In this case, the second body 30 has a height substantially equal to that of the first body 20 at the respective rear surfaces 3*a* and 3*b*.

The use of a coupling configuration like the one illustrated in FIG. 10 allows the control device 1 of FIG. 10 to be positioned on the handlebar in a rotated position with respect to a conventional device, with the levers 40 and 50 being at a greater distance from the handlebar. This situation is favorable for cyclists with large hands.

Figure 11:
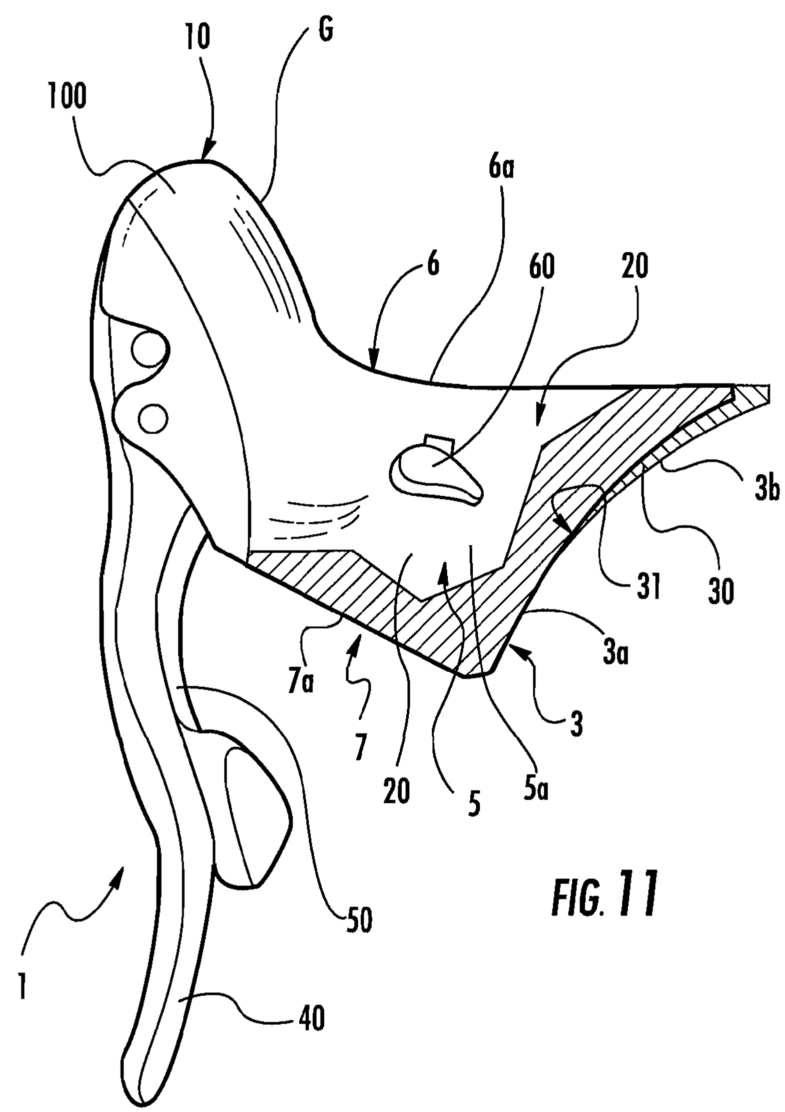

FIG. 11 illustrates a further embodiment of the control device 1. Such an embodiment differs from that of FIG. 10 only in that the second body 30 is associated with the first body 20 on a part of the rear surface 3*a* of the latter with the thickest part of the second body 30 arranged at the upper part of the rear surface 3*a* of the first body 20. The use of a coupling configuration like the one illustrated in FIG. 11 allows the control device 1 of FIG. 10 to be positioned on the handlebar in a rotated position with respect to a conventional device, with the levers 40 and 50 being closer to the handlebar. This situation is favorable for cyclists with small hands.

An alternative embodiment of the control device 1 illustrated in FIG. 11 can be provided, wherein the rear wall 3 of the control device 1 is integrally defined by the rear surface 3*b* of the second body 30. In this case, the second body 30 has a height substantially equal to that of the first body 20 at the respective rear surfaces 3*a* and 3*b*.

Figure 12:
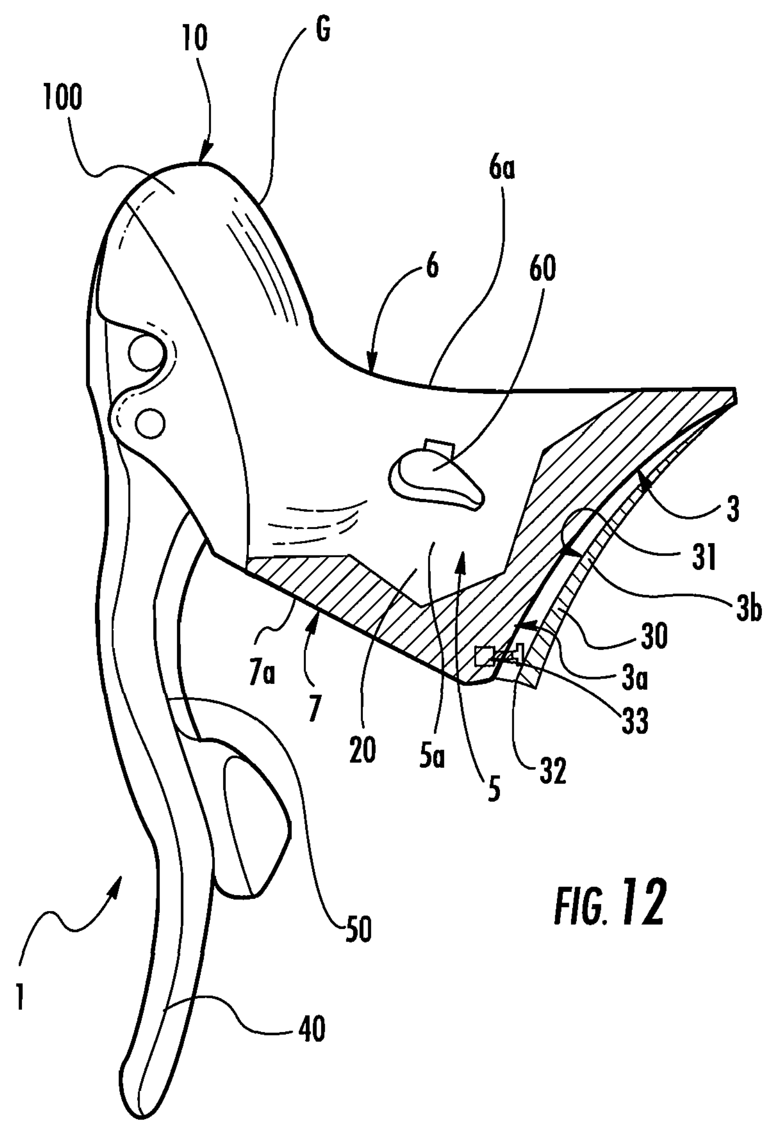

FIG. 12 illustrates a further embodiment of the control device 1. Such an embodiment differs from that of FIG. 10 in that an adjustment member of the relative position between the second body 30 and the first body 20 is provided so as to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

Figure 13:
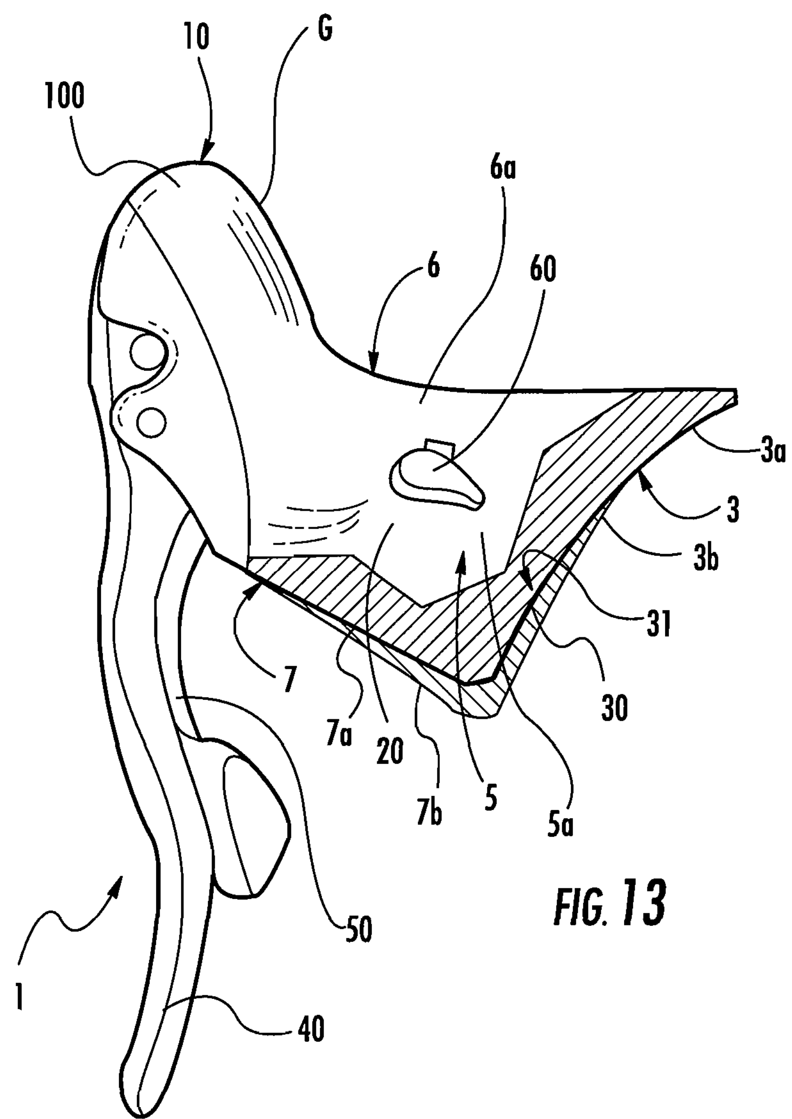

FIG. 13 illustrates a further embodiment of the control device 1. Such an embodiment differs from that of FIGS. 2 and 2*a* only in that the second body 30 is associated with the first body 20 both at part of the lower wall 7 (as in the embodiment of FIG. 2) and at part of the rear wall 3 of the control device 1 (as in the embodiment of FIG. 10) and substantially extends both on the lower wall 7 and on the rear surface 3. The second body 30 can be positioned with respect to the first body 20 so as to define a single predetermined relative position, but as for embodiments described previously it is possible to provide an adjustment member of the relative position of the second body 30 with respect to the first body 20. Such a coupling configuration allows the advantages discussed with reference to the embodiments illustrated in FIGS. 2 and 10 to be achieved.

In the embodiment of FIG. 13, the rear wall 3 of the control device 1 is in this case defined in part by the rear surface 3*a* of the first body 20 and in part by the rear surface 3*b* of the second body 30. The outer side wall 4, the inner side wall 5, and the upper transversal wall 6 of the control device 1 are defined by an outer side surface 4*a*, an inner side surface 5*a*, and an upper transversal surface 6*a*, respectively, of the first body 20, whereas the lower transversal wall 7 of the device 1 is defined by a lower transversal surface 7*b* of the second body 30.

An alternative embodiment of the control device 1 illustrated in FIG. 13 can be provided, wherein the rear wall 3 of the control device 1 is integrally defined by the rear surface 3*b* of the second body 30 and the lower transversal wall 7 of the control device 1 is defined in part by the lower transversal surface 7*a* of the first body 20 and in part by the lower transversal surface 7*b* of the second body 30. In this case, the second body 30 is shorter in length and height than the first body 20 at the respective lower transversal surfaces 7*a* and 7*b* and the respective rear surfaces 3*a* and 3*b*.

Figure 14:
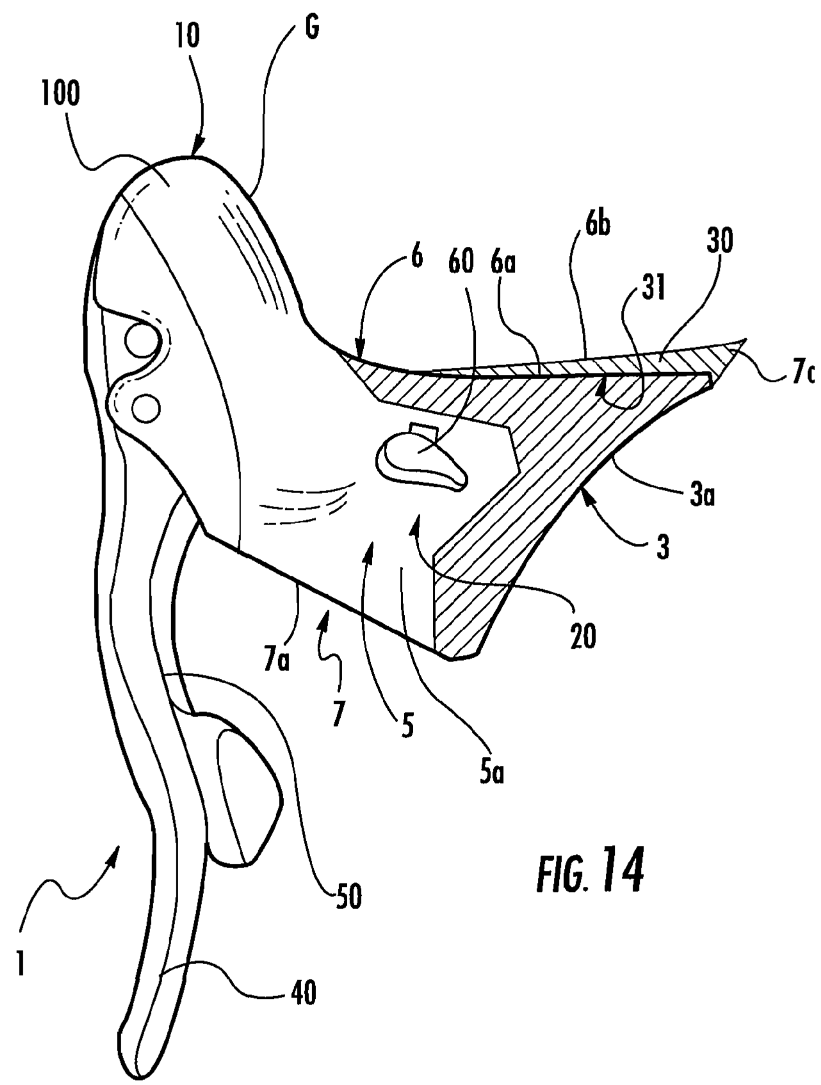

FIG. 14 illustrates a further embodiment of the control device 1. Such an embodiment differs from that of FIGS. 2 and 2*a* only in that the second body 30 is associated with the first body 20 at the upper surface 6*a* of the latter and extends over a part of the upper surface 6*a*, with the thickest part of the second body 30 arranged at the rear part of the upper surface 6*a* of the first body 20. In FIG. 14, elements corresponding to those described above with reference to the embodiment illustrated in FIGS. 2 and 2*a* are indicated with the same reference numeral.

The second body 30 can be positioned with respect to the first body 20 so as to define a single predetermined relative position. Between the surface 6*a* of the first body 20 and the coupling surface 31 of the second body 30 an adhesive substance can be provided as in, for example, a glue.

In the embodiment of FIG. 14, the upper wall 6 of the control device 1 is defined in part by the upper surface 6*a* of the first body 20 and in part by the upper surface 6*b* of the second body 30, whereas the outer side wall 4, the inner side wall 5, the rear wall 3 and the lower transversal wall 7 of the control device 1 are, on the other hand, defined by an outer side surface 4*a*, an inner side surface 5*a*, a rear surface 3*a*, and a lower transversal surface 7*a*, respectively, of the first body 20.

The second body 30 can also comprise a portion 7*c* (shown with a broken line in FIG. 14) which, projecting rearwardly with respect to the first body 20, allows the levers 40 and 50 to be brought closer to the handlebar.

An alternative embodiment of the control device 1 illustrated in FIG. 14 can be provided, wherein the upper wall 6 of the control device 1 is integrally defined by the upper surface 6*b* of the second body 30. In this case, the second body 30 has a length substantially equal to that of the first body 20 at the respective upper surfaces 6*a* and 6*b*.

The use of a coupling configuration like the one illustrated in FIG. 14 allows the grip surface of the control device to be increased. This situation is favorable for cyclists with large hands.

Figure 15:
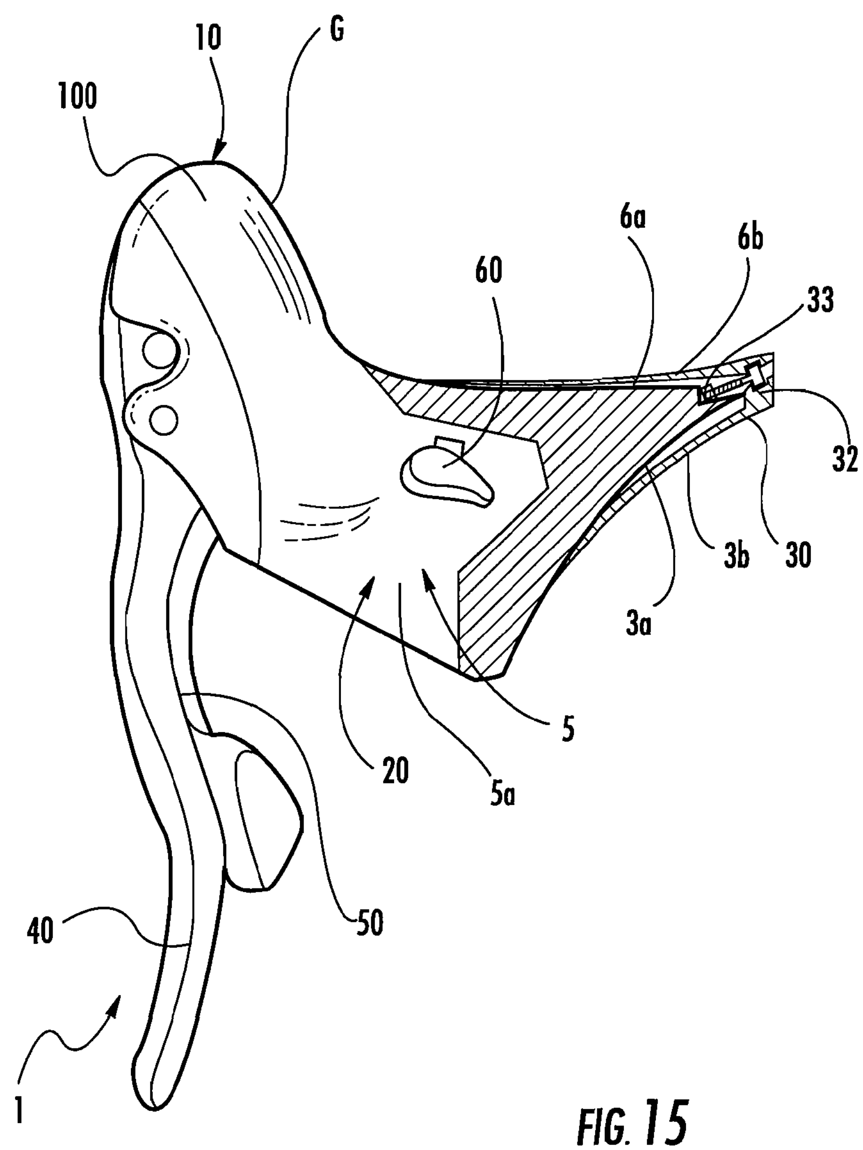

FIG. 15 illustrates a further embodiment of the control device 1. Such an embodiment differs from that of FIGS. 2 and 2*a* only in that the second body 30 is associated with the first body 20 both at part of the upper wall 6 (as in the embodiment of FIG. 14) and at part of the rear wall 3 of the latter (as in the embodiment of FIG. 11) and substantially extends both on the upper wall 6 and on the rear wall 3. The second body 30 can be adjustably positioned with respect to the first body 20. For this purpose, an adjustment member of the relative position between the second body 30 and the first body 20 is provided at the crossing point of the rear wall 3 with the upper wall 6 of the device 1, so as to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

As for the other embodiments described above, it is nevertheless possible to associate the second body 30 with the first body 20 so as to define a single predetermined relative position. Such a coupling configuration allows the advantages discussed above with reference to the embodiments illustrated in FIGS. 2 and 10 or 11 to be achieved.

In the embodiment of FIG. 15, the rear wall 3 of the control device 1 is in this case defined in part by the rear surface 3*a* of the first body 20 and in part by the rear surface 3*b* of the second body 30 and the upper wall 6 of the device is in part defined by the upper surface 6*a* of the first body 20 and in part by the upper surface 6*b* of the second body 30. The outer side wall 4, the inner side wall 5, and the lower transversal wall 7 of the control device 1 are defined by an outer side surface 4*a*, an inner side surface 5*a*, and a lower transversal surface 7*a*, respectively, of the first body 20.

An alternative embodiment of the control device 1 illustrated in FIG. 15 can be provided wherein the rear wall 3 of the control device 1 is integrally defined by the rear surface 3*b* of the second body 30 and the upper transversal wall 6 of the control device 1 is integrally defined by the upper transversal surface 6*b* of the second body 30. In this case, the second body 30 has a length and height equal to those of the first body 20 at the respective upper transversal surfaces 6*a* and 6*b* and the respective rear surfaces 3*a* and 3*b*.

One skilled in the art shall recognize that it is possible to combine the various features of the embodiments described above to obtain further embodiments, all of which are in any case within the scope of protection as defined by the subsequent claims.

A kit of parts may be used to assemble a control device 1. The kit comprises a first body 20 adapted to be associated with a bicycle handlebar and at least two second bodies 30 adapted to be selectively associated with the first body 20, wherein the at least two second bodies 30 differ in at least one from shape and size. Such a kit is supplied to the cyclist to allow him to choose the second body 30 most suitable to adapt the control device 1 to the size of his hand.

What is claimed is:

1. A control device for a bicycle, comprising:

a first body that defines a first grip portion of the control device and includes a front portion and a rear surface that is shaped to be connected to a bicycle handlebar, and an upper transversal surface that defines an upper transversal wall of the control device;

at least one lever that controls at least one bicycle component and that is directly hinged to the front portion of the first body;

a brake lever; and a second body that is distinct from the first body and from the at least one lever and the brake lever, the second body is directly connected to the first body, the second body defines a second grip portion of the control device and includes a lower transversal surface, opposite the upper transversal surface, that at least partially defines a lower transversal wall of the control device, the second body being sized and shaped to define the second grip portion's size;

wherein the upper transversal surface of the first body is configured as a palm rest surface.

2. The device according to claim 1, wherein the second body varies a distance of the at least one lever from the handlebar depending on the second grip portion's size.

3. The device according to claim 1, wherein the second body is connected to the first body at respective coupling surfaces having a matching shape.

4. The device according to claim 1, wherein the second body is positioned in a single predetermined position with respect to the first body.

5. The device according to claim 4, wherein the second body is connected to the first body through screws.

6. The device according to claim 4, wherein the second body is connected to the first body through glue.

7. The device according to claim 4, wherein the second body is connected to the first body through a snap coupling.

8. The device according to claim 1, further comprising at least one adjustment screw element for adjusting a position of the second body with respect to the first body.

9. The device according to claim 8, wherein the at least one adjustment screw element comprises a screw/female screw coupling operatively arranged between the first body and the second body.

10. The device according to claim 9, wherein one from the screw and the female screw is associated with one from the first body and second body and the other from the screw and the female screw is associated with the other from the first body and second body.

11. The control device according to claim 8, wherein the second body comprises a portion that projects rearwardly with respect to the first body.

12. The control device according to claim 8, wherein upon activation of the adjustment screw element, a grip surface of the control device and the distance of the at least one lever from the handlebar are simultaneously adjusted.

13. The device according to claim 1, wherein the second body is removably connected to the first body.

14. The device according to claim 1, further comprising an outer coating sheath which covers the first body and second body.

15. The device according to claim 1, wherein the second body is connected to a lower surface of the first body.

16. The device according to claim 15, wherein the lower transversal wall of the control device is defined in part by the lower surface of the first body and in part by the lower transverse surface of the second body.

17. The device according to claim 15, wherein the lower transversal wall of the control device is defined integrally by the lower transverse surface of the second body.

18. The device according to claim 1, wherein the second body is connected to an outer side surface of the first body.

19. The device according to claim 18, wherein the control device further comprises an outer side wall defined in part by the outer side surface of the first body and in part by an outer side surface of the second body.

20. The device according to claim 18, wherein the control device further comprises an outer side wall defined integrally by an outer side surface of the second body.

21. The device according to claim 1, wherein the second body, when connected to the first body, extends at least partially over at least one of a lower surface, an inner side surface, an outer side surface, an upper surface, and the rear surface of the first body.

22. A bicycle comprising a control device according to claim 1.

23. The control device according to claim 1, wherein the second body is connected to the first body at a lower surface of the first body and extends substantially over the entire lower surface of the first body.

24. The control device according to claim 23, wherein each of an outer side wall and an inner side part of the control device has a respective surface substantially parallel to a substantially vertical intermediate reference plane P that passes through the control device.

25. The control device of claim 1, wherein the second body changes a position of the lever relative to the bicycle handlebar by rotating the lever with respect to the handlebar.

26. The control device of claim 25, wherein the second body mates with the first body and the handlebar.

27. The control device of claim 26, wherein the second body mates with the first body in a snap engagement.

* * * * *